April 18, 1961    R. W. LUEDERS    2,980,279
INSULATED STRUCTURE
Filed July 22, 1958

INVENTOR
ROBERT W. LUEDERS

ATTORNEY

United States Patent Office 2,980,279
Patented Apr. 18, 1961

2,980,279

INSULATED STRUCTURE

Robert W. Lueders, Lancaster, Pa., assignor to Armstrong Cork Company, Lancaster, Pa., a corporation of Pennsylvania Filed July 22, 1958, Ser. No. 750,268

6 Claims. (Cl. 220—9)

This invention relates to an insulated tank or the like.

Insulated tanks are commonly used in the petroleum, chemical, and other industries. The tanks frequently are insulated to maintain the temperature of the fluid in the tank above normal temperature and in other instances, such as liquefied butane storage, the tanks are insulated to maintain the fluid, generally a gas, below normal temperatures. In some services, the tanks are used in processing of materials where periodic heating or cooling of the material in the tank is carried out. In many instances, the tanks are not housed within a building, and thus the insulated structure must be protected against the elements to avoid deterioration of the insulation.

Tanks generally, and large tanks particularly, are difficult to insulate properly, and much hand labor normally is required, resulting in high labor costs for application and finishing of the insulation.

An object of the present invention is to provide a system for insulating tanks which may be installed with a minimum of labor.

Another object of the invention is to provide an insulated tank structure in which the insulation may be protected against water and water vapor penetration thereinto. This is a particularly important object where the tanks are to be installed to maintain temperatures below normal or below freezing; for, with such tanks, the problem of water and water vapor penetration into the insulation may seriously affect the insulating efficiency of the material.

Where the contents of a tank are periodically heated or cooled, the tanks tend to expand upon heating and contract upon cooling; and this has presented many problems in securing the insulation to the tank in such fashion that it will not be damaged upon such expansion and contraction of the tank wall to which the insulation material is applied. Expensive and complicated expansion joint arrangements have been proposed and used in the industry.

Another object of the invention is to provide for the insulation of such tanks, as mentioned above, with a simple "free-standing" or self-supporting insulation structure which will permit the tank to contract and re-expand without in any manner damaging or seriously affecting the insulating sheathing applied to the tank.

Other objects of the invention will be clear from the following description of an embodiment of the invention which will be described in conjunction with the attached drawing, in which.

The various views are shown to different scales for clarity of illustration.

Figure 1:
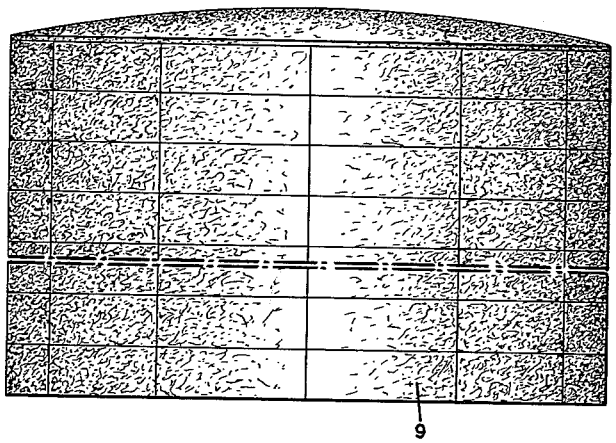
Figure 1 is a diagrammatic view illustrating an embodiment of the invention in the form of an insulated storage tank of generally cylindrical configuration disposed in a vertical position.

The tank shown in Figure 1 may be assumed to be made of metal and to be about 30′ in diameter and 60′ high and provided with a domed top. It is pointed out that the invention is not limited to tanks of any particular size or construction. Most tanks are cylindrical in shape and vertically disposed. Some tanks, however, are of O shape, and some tanks are disposed in a horizontal or inclined position. The present invention is applicable to all such tank constructions although the embodiment chosen for illustration is a cylindrical tank which is disposed with its axis in a generally vertical position.

Figure 2:
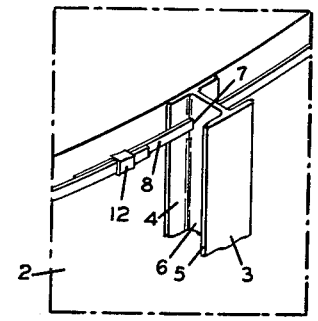
Figure 2 is a detailed perspective view showing an insulation mounting support and attaching band on the curved wall of a tank.
Figure 3:
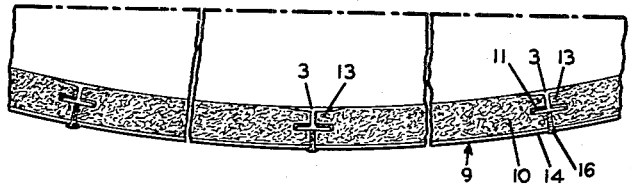
Figure 3 is a top plan view showing a portion of a tank, such as shown in Figure 1, prior to installation of the top insulation.

The wall 2 of the tank to be insulated, as shown in Figure 2, has mounted thereon a plurality of nonconducting supports 3, one of which is shown in Figure 2. A number of the supports are shown in Figure 3. The supports 3 preferably are formed of molded fiber glass reinforced polyester resin or other molding resin composition, such as phenol-formaldehyde resin. They also may be formed of extruded filled thermoplastic synthetic resin compositions, such as polyethylene, polystyrene, polyvinyl chloride, or other nonmetallic material which is a poor thermal conductor, that is, essentially nonconducting.

The supports 3 preferably are mounted generally parallel to the axis of the tank, vertically of the tank as shown in Figure 1. The supports are of generally I shape in section and include an inner flange 4, an outer flange 5, and a connecting web 6. A typical support for use in the erection of insulation panels 6′ long x 2′ wide and 2″ thick may have flanges 4 and 5 about 2″ wide and about 0.035″ thick and a connecting web about 1″ deep and about 0.055″ thick when made of fiber glass reinforced polyester resin.

The web 6 is provided with spaced slots 7 disposed adjacent to the flange 4. The slots are dimensioned to pass a connecting band 8 therethrough. The band may be of galvanized iron about 1″ wide and about 0.020″ gauge. In a typical installation, the slots 7 will be provided in the web, spaced on 12″ centers.

Figure 5:
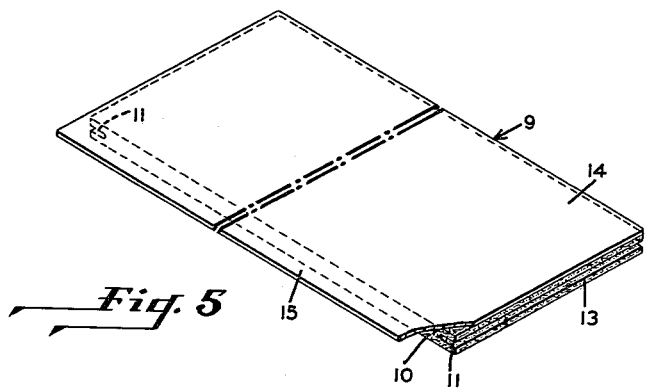
Figure 5 is a perspective view showing a panel of insulation material of the type shown in the structure of Figure 4.

The supports 3 are spaced circumferentially around the tank on centers which will permit insulating panels 9 to be fitted in between adjacent pairs of supports 3, as shown in Figure 3, with the insulation material 10 being kerfed, as indicated at 11 in Figure 5, on the two transverse edges thereof to receive the outer flanges 5 of adjacent insulation supports 3. For example, with insulation panels of the size mentioned above, the supports 3 will be spaced circumferentially about 72″ apart to receive the insulation panels on edge therebetween. In the event the circumference of the tank is not a multiple of the length of the insulation panels 9, there may be one section which will require insulation panels of shorter length which may be cut, kerfed, and fitted on the job.

The supports 3 are held in proper position on the tank wall 2 by drawing up the bands 8 and clamping the overlapped ends in fixed position by clamping members 12, as shown in Figure 2. A metal band tensioning and clamping device, such as used in the packaging industry, may be provided for this purpose. These bands when drawn up tightly hold the supports 3 in good close engagement with the wall 2 of the tank.

Where the insulation panel 9 is about 2″ thick, as in the above example, and the depth of the web 6 measured between the flanges 4 and 5 is about 1″, the saw kerf 11 will be provided about midway of the thickness of the insulation. The disposition of the kerf 11 will depend upon the size of the I-shaped support used. Preferably, the kerf 11 will be so arranged that the insulation material will fit snugly or under slight compression between the flanges 4 and 5 and thus will be positioned closely adjacent to the wall 2 of the tank. The saw kerf may be so formed that when adjacent panels 9 are installed, the edges of adjacent panels of insulation will lie in abutting engagement. This may be accomplished by cutting back the inner edge 13 by an amount equivalent to one half the thickness of the web 6. This is not necessary, however, for the joint between abutting panels may be sealed readily as will be more fully discussed below.

An insulating panel is shown in Figure 5. The panel includes the layer of insulation 10 which may be formed of polystyrene resin beads expanded and joined together into a substantially rigid body which is capable of limited flexure. The outer surface of the body 10 is covered with a rigid protective layer 14 which may be a sheet of unplasticized vinyl resin about 0.030" thick. The facing layer 14 preferably is adhered throughout to the face of the body 10 of insulation. An extending flap or flange 15 is provided which projects beyond an edge of the body 10 of insulation. The facing layer 14 serves as a water vapor barrier and also as a protective and decorative covering.

Figure 4:
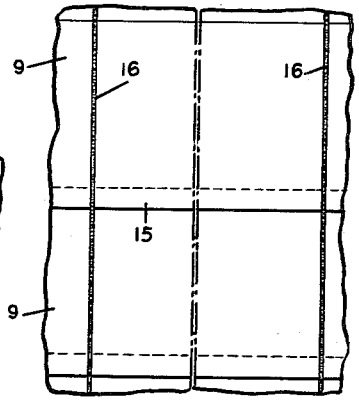
Figure 4 is a front view, broken away, showing a portion of the insulated tank.

In the erection of the insulation, the supports 3 are properly positioned and banded into place. Workmen then insert the insulation panels in position between adjacent pairs of supports 3. The panels may be inserted by placing one 24" transverse edge of a panel into position with the kerf 11 receiving an outer flange 5 of one of the supports 3 and the portion 13 below the kerf disposed in the opening defined by the flanges 4 and 5 of the support 3. The panel is then flexed along its 72" length in an outward direction, and the opposite 24" transverse edge of the panel is inserted over the flange 5 on the next adjacent support 3. The panel is then permitted to "snap" into position with the flange 5 being received within the kerf 11. The natural resiliency of the insulation material from which the body 10 of the panel is made will cause the panel to tend to assume a flat condition. The portions 13 lying below the flanges 5 of the adjacent supports 3 will be yieldingly or resiliently urged into engagement with the supports. The natural resiliency of the facing layer 14 may aid in imparting the desired "snap action."

Where the panel includes a protective facing 14, as in Figure 5, the flanges 15 are carefully lapped over the previously applied panel, as shown in Figure 4. If the facing layer is to serve as a vapor barrier, it may be desirable to have the flanges 15 adhesively sealed in position to form a vaporproof joint.

When the topmost panel has been installed, any portion which may project above the top of the tank is trimmed off. When all of the panels have been installed against the side wall, the top of the tank is covered with insulation in the conventional manner, usually by adhesively bonding insulation panels directly to the top wall of the tank. The top of the tank is then finished by application of a vaporproofing and weatherproofing covering, if necessary. Generally, a plastic coating is applied; or where the tank is for outside service, a membrane reinforced asphalt mastic may be used, for example. A metal or other flashing may be provided at the joint where the top and side walls meet.

Figure 1 shows a completed tank without any finishing or protecting layers or coverings. While it is preferred to apply the facing to the insulation panels prior to installation, it is obvious that the facing may be applied subsequent to installation of the insulation panels. A plastic protective and/or decorative coating may be desired, for example, and this preferably will be applied as a finishing step after the insulation has been positioned. For some services, as in the interior of chemical processing plants, no such finishing or protecting coverings may be needed, but generally a covering is used.

In some instances, sheets of metal, fiber glass reinforced polyester resin, or other facing materials may be fastened mechanically or adhesively to the face of the insulation material after completion of the erection. Suitable overlapping of the joints may be effected. Preferably, however, the panels are prefabricated as shown in Figure 5, and the joint between adjacent panels, overlying the supports 3, is filled with caulking compound 16 which serves to seal the joint between adjacent panels. Where the edges of the panels 9 are cut back as previously mentioned, a bead of caulking composition may be disposed over the abutting joint to provide a water and vapor seal.

The invention has been shown in Figures 1–4 as embodied in a vertically disposed tank. The invention is also quite useful with horizontally disposed tanks; for by disposing the supports within kerfed openings provided in the insulation, as shown in Figure 3, there is a single joint between adjacent panels which may be readily sealed against moisture or moisture vapor penetration into the insulation. The structure will readily shed water and may be directly exposed to the elements.

The type of insulation material used is not critical. It is preferred to use a semirigid but resilient insulation such as polystyrene resin beads, corkboard, and the like. Any thermal insulation which has adequate strength and other structural characteristics to permit kerfing and to withstand the forces developed in the insulation in the "snap in" installation and the required resiliency causing it to tend to assume a flat condition, which latter properly may be supplemented by use of a stiff but resilient facing layer, may be used.

It will be clear from the foregoing that the insulation may be conveniently applied with a low labor cost, and a sealed insulation layer will be provided if the joints are sealed and a protective facing is applied where necessary. It will also be clear that the insulation which is supported practically entirely by the supports 3 will be "free-standing" and the tank may contract and re-expand without subjecting the insulation to objectionable stresses.

I claim:

1. A thermally insulated structure having a convexly curved wall surface, insulation for said convexly curved wall surface comprising a plurality of edge abutting normally flat rectangular panels of semirigid and resilient insulation material enclosing said curved wall surface, said panels being disposed in curved, sprung condition with their outer faces in tension between pairs of non-conducting I-shaped supports attached to said structure by bands which encircle said curved wall surface, said supports including oppositely projecting inner flanges clamped against said curved surface by said bands and oppositely directed outer flanges disposed outwardly of said curved wall surface, adjacent pairs of the outer flanges being received within kerfs provided in opposite transverse edges of said insulation material and holding said panels in said curved and tensioned condition.

2. A thermally insulated structure in accordance with claim 1 in which the inner portions of said body of insulation below said kerfs are recessed to receive the webs of said adjacent pairs of I-shaped supports and in which adjacent edges of said panels disposed over said supports lie in substantially abutting relationship.

3. A thermally insulated structure in accordance with claim 1 in which said panels include a rigid flexible facing layer joined to the body of insulation material.

4. A thermally insulated structure in accordance with claim 3 in which said facing layer is adhesively bonded to the outer face of said body of insulation.

5. A thermally insulated structure in accordance with claim 1 in which the joint between abutting insulation panels is sealed with a plastic composition.

6. A thermally insulated structure in accordance with claim 1 in which the wall surface is substantially cylindrical and is disposed with its axis substantially vertical and in which said panels include a body of insulation material and a rigid flexible facing layer bonded to the body of insulation material and in which said facing layer includes a flange which projects beyond one substantially horizontally disposed longitudinal edge of said body of insulation material and overlies the opposite longitudinal edge of the next adjacent lower panel.

References Cited in the file of this patent

UNITED STATES PATENTS

| | | |
|---|---|---|
| 1,675,354 | Scott | July 3, 1928 |
| 1,888,039 | Huff | Nov. 15, 1932 |
| 2,181,074 | Scott | Nov. 21, 1939 |
| 2,323,297 | Collins | July 6, 1943 |
| 2,731,374 | De Reus | Jan. 17, 1956 |
| 2,741,268 | Plunkett | Apr. 10, 1956 |